United States Patent [19]

Koseki et al.

[11] Patent Number: 4,751,582
[45] Date of Patent: Jun. 14, 1988

[54] OFFICE MACHINE HAVING CLAMSHELL STRUCTURE

[75] Inventors: Junichi Koseki, Tokyo; Kunihiko Miura, Hiratsuka, both of Japan

[73] Assignee: Kabushiki Kaisha Toshiba, Kawasaki, Japan

[21] Appl. No.: 887,628

[22] Filed: Jul. 21, 1986

[30] Foreign Application Priority Data

Jul. 24, 1985 [JP] Japan .................................. 60-163166

[51] Int. Cl.⁴ .............................................. H04N 1/10
[52] U.S. Cl. ...................................... 358/256; 455/606
[58] Field of Search ................. 358/256, 75; 455/602, 455/606, 607; 355/3, 14 R, 24, 26, 46, 77

[56] References Cited

U.S. PATENT DOCUMENTS 3,794,841  2/1974  Cosentino ........................... 455/602
4,466,729  8/1984  Iwata ............................... 358/3 CH

FOREIGN PATENT DOCUMENTS 0108623  5/1984  European Pat. Off. .
1665439  10/1971  Fed. Rep. of Germany .
2237695  2/1974  Fed. Rep. of Germany .
3127088  1/1983  Fed. Rep. of Germany .
3237410  4/1983  Fed. Rep. of Germany .

*Primary Examiner*—Michael A. Masinick
*Attorney, Agent, or Firm*—Cushman, Darby & Cushman

[57] ABSTRACT

An office machine is disclosed, which comprises a second (lower) unit and a first (upper) unit capable of being opened and closed with respect to the lower unit. A plurality of light-emitting elements and a plurality of light-receiving elements are provided in the lower unit, and a plurality of light-emitting elements and a plurality of light-receiving elements are provided in the upper unit. The control signal and data signal are fed to the light-emitting elements to be converted into optical on-off signal. The light-receiving elements receive the optical signal and convert it into electric signal which is fed to necessary parts. Control signal lines and data signal lines between the two units are thus replaced with an optical relay.

14 Claims, 9 Drawing Sheets

OFFICE MACHINE HAVING CLAMSHELL STRUCTURE

BACKGROUND OF THE INVENTION

This invention relates to an office machine having clamshell structure, which comprises a first and second units, these units being capable of being opened and closed relative to each other, and in which signal transmission between the units is done by light transmission.

There have been proposed office machine such as image readers, copiers, and laser printers, which adopt a two-frame structure consisting of two frames capable of being opened and closed relative to each other. For example, an image reader has a structure, in which an upper (or first) unit accommodating an optical system is hinged for being opened and closed about a line in the neighborhood of a document transport path between the upper unit and a lower (or second) unit. At the time of jamming of a document, the jammed document can be readily removed from the document transport path by opening the upper unit.

In this arrangement, the wiring of control signal and data signal lines for signal transmission between the upper and lower units is concentrated about the fulcrum point (i.e., an axis) about which the upper unit is turned when it is opened and closed.

Therefore, a large space for wiring is required in the neighborhood of the fulcrum axis. In addition, repeated opening and closing will promote deterioration of the wiring. Further, the assembling of the machine requires the wiring of control signal and data signal lines as well as a provision of parts such as connector used for the wiring. Thus, the assembling operation is complicated, leading to an increased cost. Still further, the apparatus is susceptible to the influences of external electric and magnetic noise.

SUMMARY OF THE INVENTION

The present invention is contrived in consideration of these circumstances, and is intended to provide an office machine of a structure capable of being opened and closed, which does not require any parts such as connector for wiring to permit the assembly operation to increase in efficiency and for reduce the cost, and is also less susceptible to the influences of external electric and magnetic noise.

According to an aspect of the invention, there is provided an office machine having clamshell structure, comprising a first unit and a second unit capable of being opened and closed with respect to the first unit with a signal transfer between the first and second units, which comprises an optical signal transmitting means for permitting signal transmission between the first and second units by converting an electric signal into an optical signal on either side of first and second units and recovering the electric signal on the opposite side.

DETAILED DESCRIPTION OF THE PREFERRED EMBODIMENTS

Figure 1:
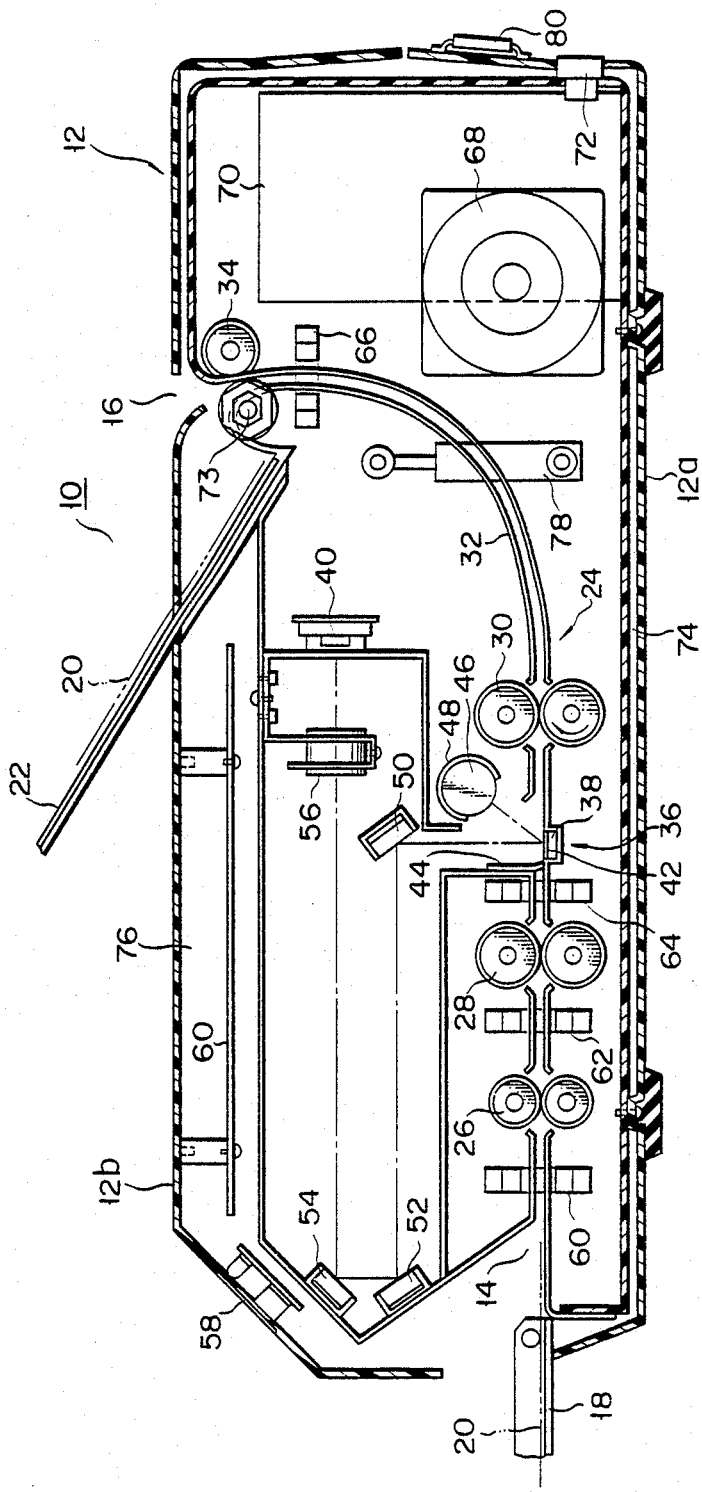
FIG. 1 is a sectional view showing an image reading apparatus as an office machine having clamshell structure according to the invention.
Figure 2:
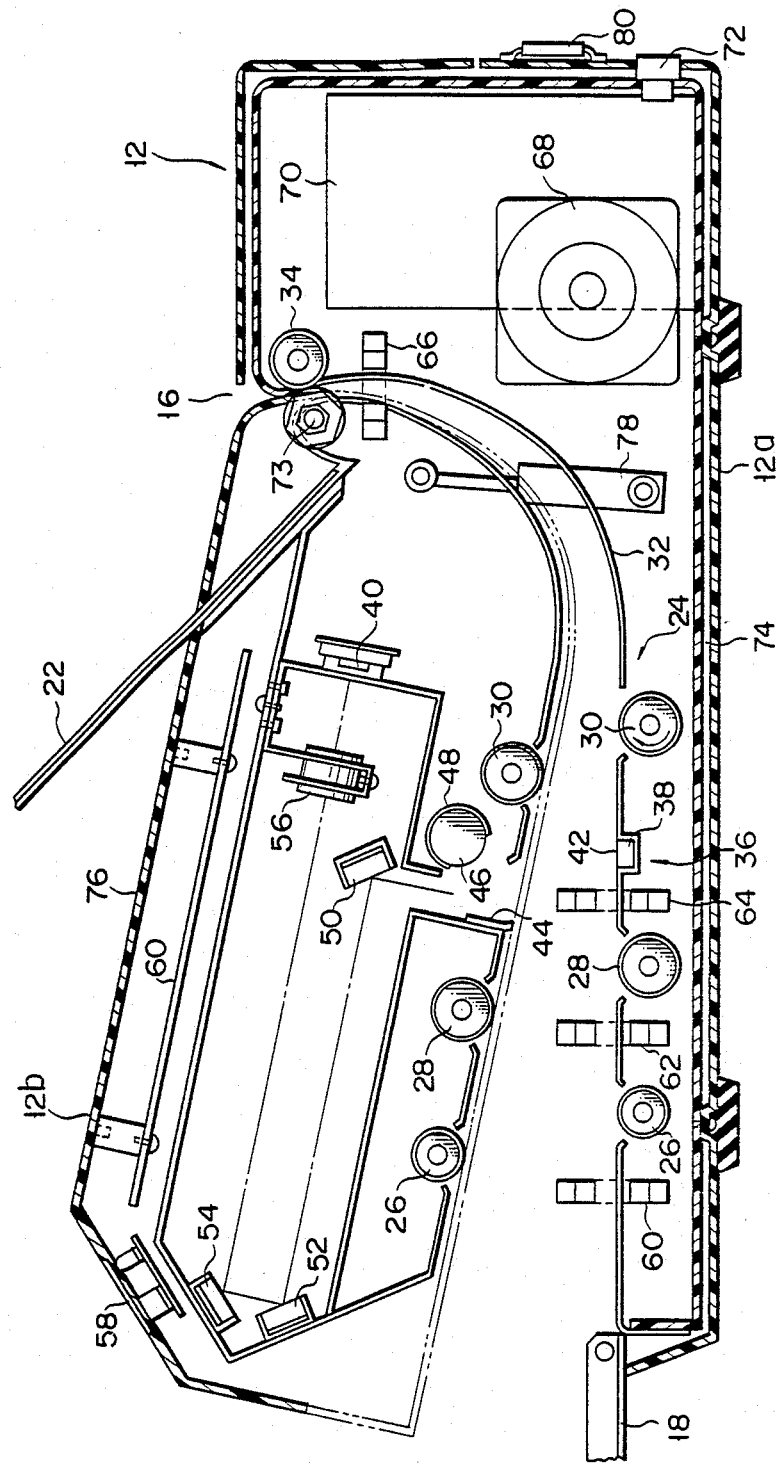
FIG. 2 is a sectional view showing the image reading apparatus of FIG. 1 with an upper unit shown opened.

FIGS. 1 and 2 illustrate an image reading apparatus as an embodiment of the office machine having clamshell structure according to the invention. The illustrated image reading apparatus is generally designated by reference numeral 10, having housing 12. The apparatus has document inlet 14 provided in a left lower portion and document outlet 16 provided in a right upper portion. Manual document feed guide 18 is detachably provided at document inlet 14. Document 20 with an image formed thereon may be fed along manual document guide 18 with the image side (front side) up. Document discharging tray 22 is provided at document outlet 16 such that it is inclined a predetermined angle. Document 20 discharged in a reversed state from document outlet 16 is accommodated with the image side down.

Between document inlet 14 and document outlet 16, a document transport path 24 is formed, along which document 20 fed from document inlet 14 is transported to be reversed at its outlet side end to be led to document outlet 16. Document transport path 24 is constituted by a pair of feed rollers 26, a pair of aligning rollers 28, a pair of transport rollers 30, guide section 32 having an arcuate sectional profile, and a pair of discharging rollers 34. The pair of feed rollers 26 have a structure for setting inserted document 20 with respect to a left side reference position. The pair of aligning rollers 28 serve to align the leading end of document 20 fed by feed rollers 26. To this end, they are of a one-way clutch structure, with the upper roller being made of a plastic material and the lower roller made of rubber. The pair of transport rollers 30 are also of a one-way clutch structure for transporting document 20 from aligning rollers 28 to document outlet 16. Guide section 32 of the path serves to guide document 20 transported by transport rollers 30. Discharging rollers 34 are provided at document outlet 16 for discharging document 20 having been guided along guide section 32 to discharging tray 22.

Image reading position 36 is set at an intermediate portion of document transport path 24, i.e., between aligning rollers 28 and transport rollers 30. Reference color compensation member 38 is provided at image reading position 36 such that document 20 is transported over reference color compensation member 38. Reference color compensation member 38 serves to read out white level compensation data for compensating an image signal containing shielding from line sensor 40 to be described later.

Glass plate 42 is provided as a light-transmitting member having excellent light transmittivity such that it is in close contact with reference color compensation member 38. Glass plate 42 serves to prevent contamination of reference color compensation member 38 that might otherwise result from the friction between reference color compensation member 38 and document 20.

Over reference color compensation member 38 document keep member 44 is provided right before image reading position 36. Document keep member 44 serves to contact document 20 lightly to prevent a pop-up of document 20 right before it reaches image reading position 36.

Document keep member 44 preferably is thin and has certain elasticity. It may best be a polyester film, for instance.

Fluorescent lamp 46, which emits green light, is provided as a light source above reference color compensation member 38. Temperature preservation heater 48 is held in close contact with a predetermined portion of the tube surface of fluorescent lamp 46 to maintain a constant tube wall temperature. A temperature-sensitive resistive element (i.e., a thermistor, not shown) is provided on a predetermined portion of the surface of temperature preservation heater 48 to detect the tube wall temperature.

Light from fluorescent lamp 46 is projected on reference color compensation member 38 or document 20 transported thereover. Light reflected by reference color compensation member 38 or document 20 is reflected by reflecting mirrors 50, 52, and 54 and then transmitted through lens 56 to be focused on CCD line sensor 40, which serves as a photoelectric transducer. Line sensor 40 converts an optical signal into an electric signal. For line sensor 40, "TCD105" by Kabushiki Kaisha Toshiba may be used. Reflecting mirrors 50, 52, and 54 have provided vibration-proof mats as antivibration means. Fluorescent lamp 46 and line sensor 40 extend at right angles to the direction of the transport of document 20.

The front of housing 12 is provided with operation panel 58, which has push-buttons for various operations, displays, etc. Printed circuit board 60, in which a control circuit and the like are assembled, is disposed in housing 12 in the neighborhood of the top wall of the housing.

Document sensor 61 is provided in document transport path 24 before transport rollers 26 to detect when document 20 is inserted. Document sensor 62 is provided in the document transport path before aligning rollers 28 to detect whether document 20 being transported has reached aligning rollers 28. Document sensor 64 is provided in document transport path 24 before image reading position 36 to detect document 20 being transported by aligning rollers 28, and to generate a read-start timing signal for starting the read-out of the white level compensation data of reference color compensation member 38. Document sensor 66 is provided in document transport path 24 before discharging rollers 34 to detect discharging of document 20. Document sensors 61, 62, 64 and 66 are all photo-interpreters.

Reference numeral 68 designates a stepping motor for supplying power to the various drive systems. When the motor is driven forwardly, feed rollers 26 are driven by means of a one-way clutch. When the motor is driven reversely, aligning rollers 28, transport rollers 30, and discharging rollers 34 are driven. Reference numeral 70 designates a power supply unit for generating DC voltages used for various controls. Reference numeral 72 designates a connector, through which the apparatus is connected to an external apparatus.

Housing 12, as shown in FIG. 2, consists of lower and upper housing halves 12a and 12b, which border on each other along document transport path 24. Housing halves 12a and 12b are rockable with respect to each other about shaft 73 of one of discharging rollers 34. Upper housing half 12b can be opened upwardly by a predetermined angle as shown in FIG. 2. In lower housing half 12a are provided manual document feed guide 18, the lower one of document feed rollers 26, the lower one of aligning rollers 28, the lower one of transport rollers 30, the lower guide member constituting guide section 32, one of discharging rollers 34, reference color compensation member 38, glass plate 42, document sensors 61, 62, 64, and 66, stepping motor 68, power supply 70, and connector 72. These components constitute lower unit (or second unit) 74. In upper housing half 12b are provided discharging tray 22, the upper one of document feed rollers 26, the upper one of aligning rollers 28, the upper one of transport rollers 30, the upper guide member constituting guide section 32, document keep member 44, fluorescent lamp 46, reflecting mirrors 50, 52, and 54, lens 56, line sensor 40, operation panel 58, and printed circuit board 60. These components constitute upper unit (first unit) 76. With this construction, document 20 jammed in document transport path 24 can be readily disposed of.

When upper unit 76 is opened, it is held in a suitable open angle state so that documents 20 accommodated in discharging tray 22 will not fall out. Upper unit 76 also is biased in the upwardly opening direction by balancer 78 (consisting of an oil hydraulic mechanism, a spring, etc.) provided in housing 21. When a lock mechanism (not shown) is released, upper unit 76 is automatically brought to an open state at a predetermined angle relative to the lower unit by the action of balancer 78.

Housing 12 has a grip 80 provided on the lower portion of the right side (i.e., rear side). Apparatus 10 thus can be carried by gripping grip 80 with a hand. Grip 80 is provided on the side in which the fulcrum axis for upper unit 76 (i.e., shaft 73), is to reduce the burden on the shaft when the apparatus is carried.

Figure 3:
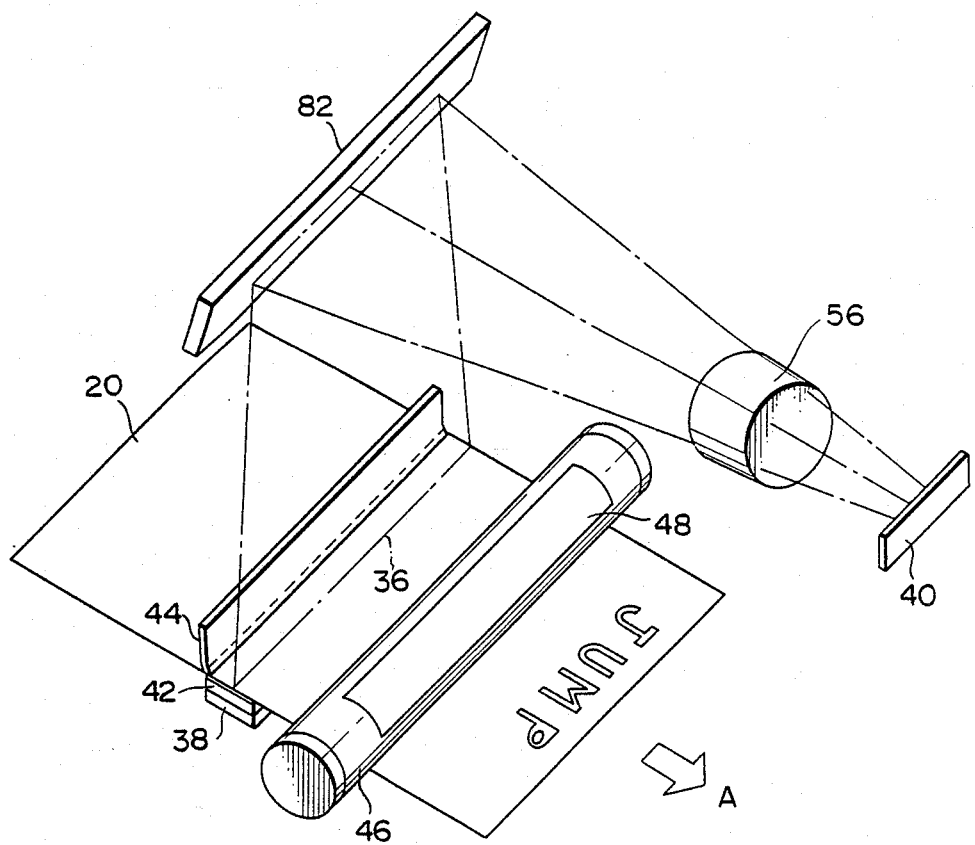
FIG. 3 is a view showing in detail a section, in which image is read out.

FIG. 3 shows in detail a section, in which the image on document 20 is read out by utilizing light from fluorescent lamp 46. Here, document 20 is shown in a state being transported in the direction of arrow A. Pop-up of document 20 is prevented immediately before image reading position 36 by glass plate 42 and document keep member 44. Light emitted from fluorescent lamp 46 is projected onto reference color compensation member 38 or document 20 at image reading position 36. Reflected light is led by reflecting mirror 82 to lens 56 to be focused on line sensor 40. With this apparatus 10, while level compensation data of reference color compensation member 38 and image of document 20 are read out at the same reading position 36. In FIG. 3, only a single reflecting mirror is shown, with the length of the light path simplified, for the sake of explanation.

Figure 4:
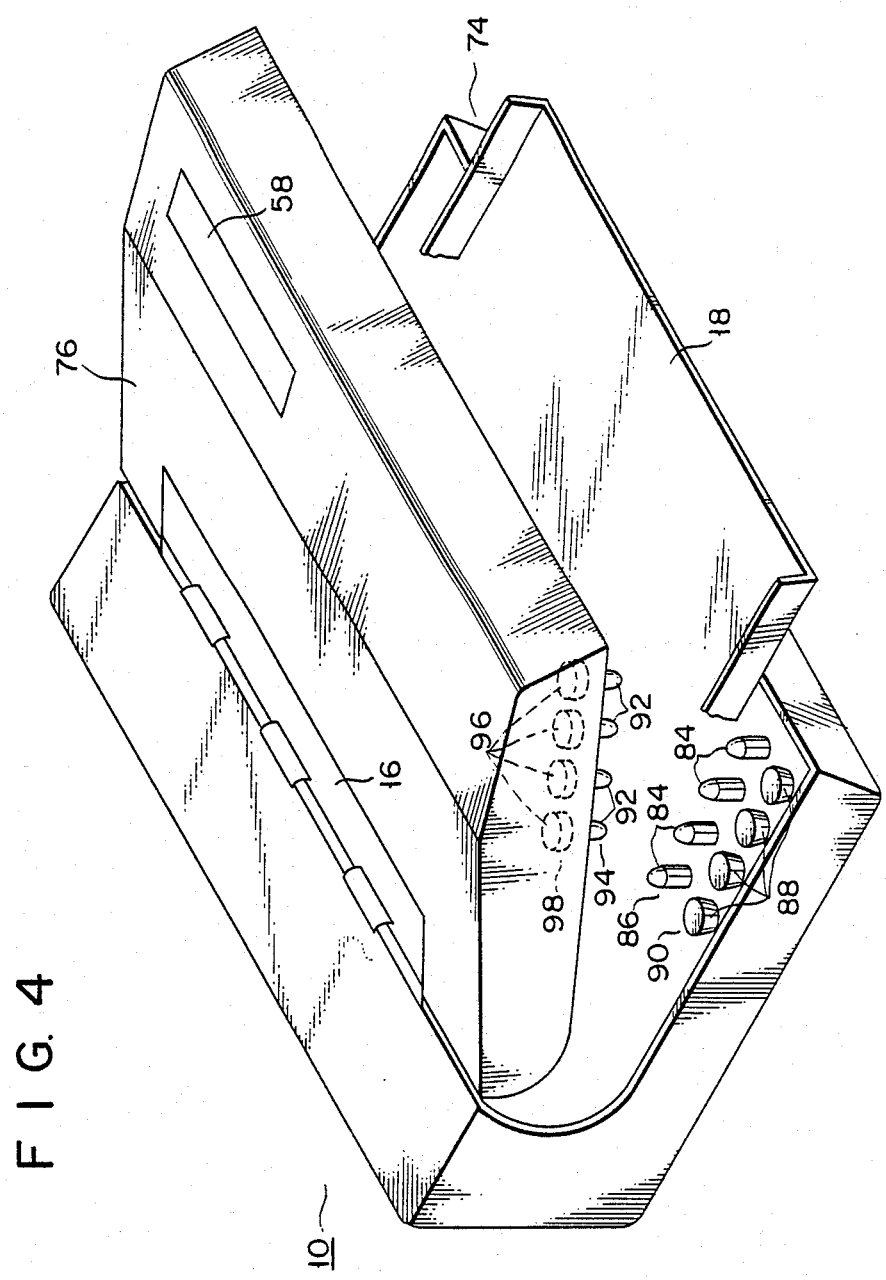
FIG. 4 is a perspective view showing an essential part of the image reading apparatus shown in FIG. 1.

FIG. 4 is a perspective view showing image reading apparatus 10 with upper unit 76 in an open state. Image reading apparatus 10 is constructed such that signal transmission between units 74 and 76 is done by light transmission. On lower unit 74, a light-emitting element group 86 consisting of a plurality of light-emitting elements 84 and a light-receiving element group 90 consist of a plurality of light-receiving elements 88 provided. On upper unit 76 are also provided a light-emitting element group 94 consisting of a plurality of light-emitting elements 92 and a light-receiving element group 98 consisting of a plurality of light-receiving elements 96. Light-emitting elements 84 of lower unit 74 face light-receiving elements 96 of upper unit 76. Light-receiving elements 88 of lower unit 74 face light-emitting elements 92 of upper unit 76. Light-transmitting elements 84 and 92 and light-receiving elements 88 and 96 are mounted such that they are positioned within permissible ranges when upper unit 76 is closed. Control and data signals are fed to light-emitting elements 84 and 92 to be converted into light on-off signals. Light-receiving elements 96 and 88 receive the light signal and convert it into an electric signal which is fed to the related parts. It is to be noted that the control signal and data signal lines between units 74 and 76 are thus replaced with this optical relay.

Figure 5:
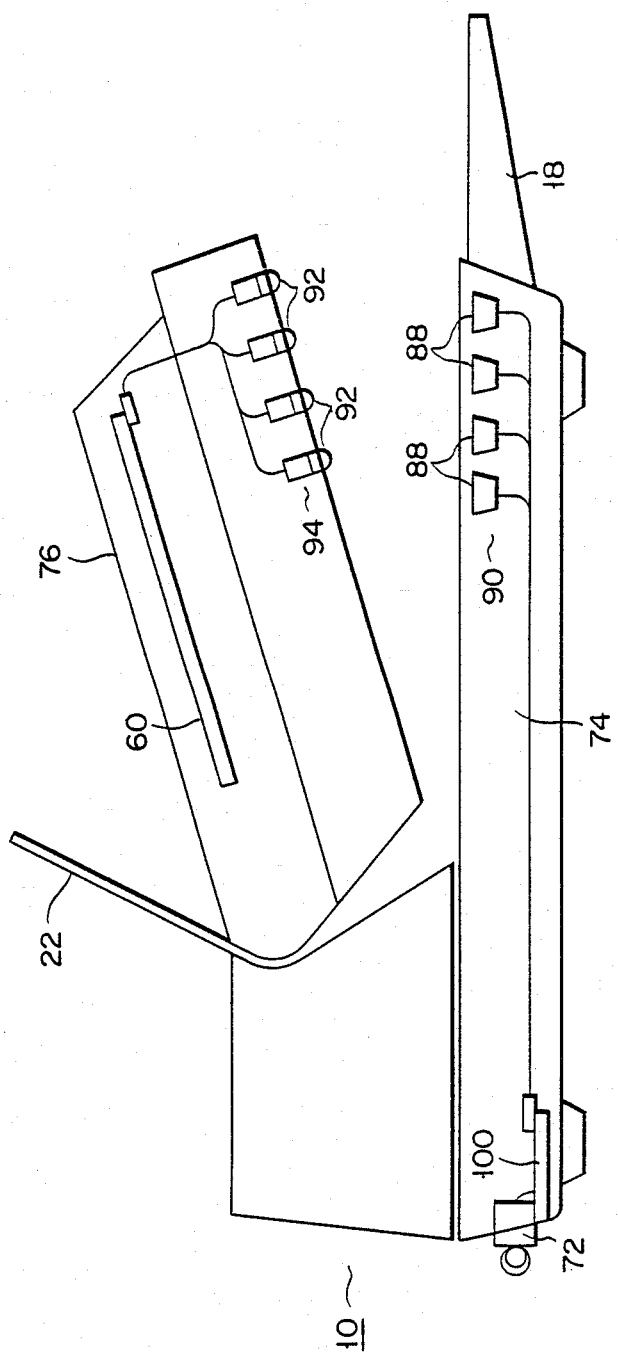
FIG. 5 is a side view showing an inner essential part of the image reading apparatus shown in FIG. 4.

FIG. 5 is a side view showing an inner essential part of the image reading apparatus of FIG. 4. Lower unit 74 is provided with connector 72, to which a cable leading from an external apparatus (not shown) is connected. Connector 72 is mounted on connector support plate 100 provided in lower unit 74. Harnesses for signals with respect to light-emitting and light-receiving groups 86 and 90 in lower unit 74 are connected to connector support plate 100, and thence connected to connector 72 coupled to the external apparatus.

Printed circuit board 60, in which a control circuit for controlling image reading apparatus 10 is assembled, is provided in upper unit 76. Harnesses for signals with respect to light-emitting element group 94 and light-receiving element group 98 in the upper unit 76 are connected to printed circuit board 60.

More specifically, a command signal supplied from the external apparatus is fed through connector 72 and connector support plate 100 to light-emitting elements 84 in lower unit 74 for conversion from an electric signal into an optical signal. In upper unit 76, light receiving elements 96 receive the optical signal and convert it into an electric signal. The electric signal thus obtained is fed to printed circuit board 60.

The status and image data signals from printed circuit board 60 are converted by light-emitting elements 92 in upper unit 76 from an electric signal into an optical signal. In lower unit 74, light-receiving elements 88 receive the optical signal and convert it into an electric signal. The electric signal thus obtained is fed through connector support plate 100 and connector 72 to the external apparatus.

Figure 6:
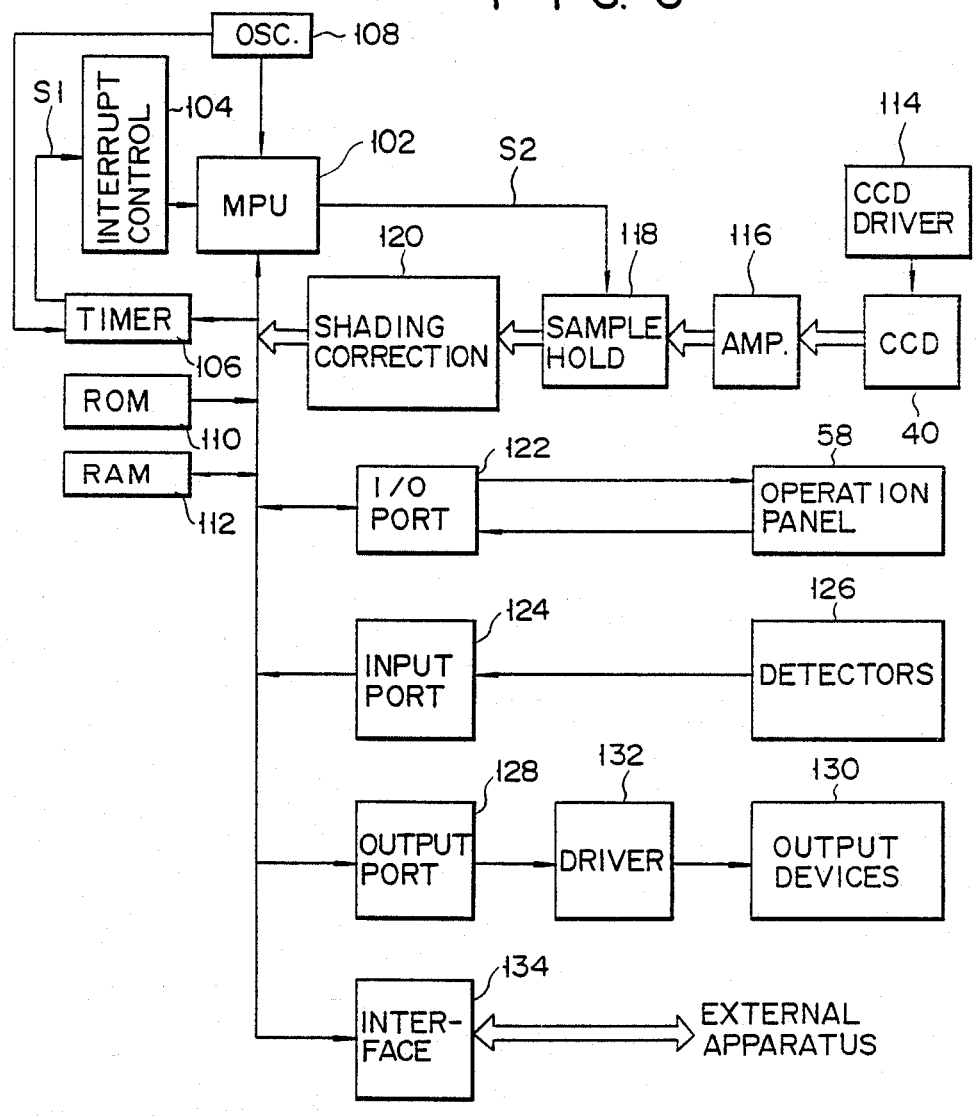
FIG. 6 is a block diagram showing the electric circuitry of the image reading apparatus shown in FIG. 4.

FIG. 6 shows a block diagram showing the electric circuitry of image reading apparatus 10. Image reading apparatus 10 is entirely controlled by microprocessor unit (MPU) 102. Interruptions to MPU 102 are controlled by interrupt control circuit 104. Interrupt control circuit 104 passes an interrupt request signal S1 from timer 106 to MPU 102. Timer 106 is a universal timer which generates interrupt request signal S1 noted above and a basic timing signal at the time of the transport of a document. Crystal oscillator (OSC) 108 feeds a basic clock pulse to MPU 102 and timer 106.

In a read only memory (ROM) 110 are stored all control programs and data tables for operating apparatus 10. Random access memory (RAM) 112 is used as a working memory.

Reflected light from document 20 is projected onto CCD line sensor 40. Line sensor 40 serves as a photoelectric transducer as noted above, which reads out image data with a resolution of 16 dot/mm. CCD driver circuit 114 generates a basic clock pulse for driving CCD line sensor 40. A low level image signal from CCD line sensor 40 is amplified by amplifier (AMP) 116 and then fed to sample/hold circuit 118. Sample/hold circuit 118 has a function of selecting a 16 dot/mm processing or a processing culling out from 16 dot/mm to 8 dot/mm with respect to an image read-out output signal from CCD line sensor 40 according to selecting signal S2 from MPU 102. The image read-out output signal from CCD line sensor 40 contains a shading distortion. The shading distortion means irregularities of the light emission characteristics of fluorescent lamp 46 and fluctuations of a light-sensitive section of CCD line sensor 40. The image read-out output signal containing the shading distortion is corrected for shading by shading correction circuit 120.

Input/output (I/O) port 122 is provided for outputting display data to operation panel 58 and for inputting data of the operated push-buttons such as a document density setting push-button on operation panel 58. Input port 124 is provided for reading out data of document sensors 61, 62, 64, and 66 and various detectors 126 such as thermistors (not shown). Output port 128 is provided for passing control data from MPU 102 to driver circuit 132 for driving various output devices 130 such as stepping motor 68, fluorescent lamp wall temperature preservation heater 48 and a fluorescent lamp driver (not shown).

The transfer of information between apparatus 10 and external apparatus is effected through interface circuit 134. Interface circuit 134 serves to receive command codes from the external apparatus and transmit status codes and read-out image data from apparatus 10 to the external apparatus. Reference numeral 70 in FIG. 6 designates a power supply drive for supplying currents to the control units and drive units of apparatus 10.

Figure 7:
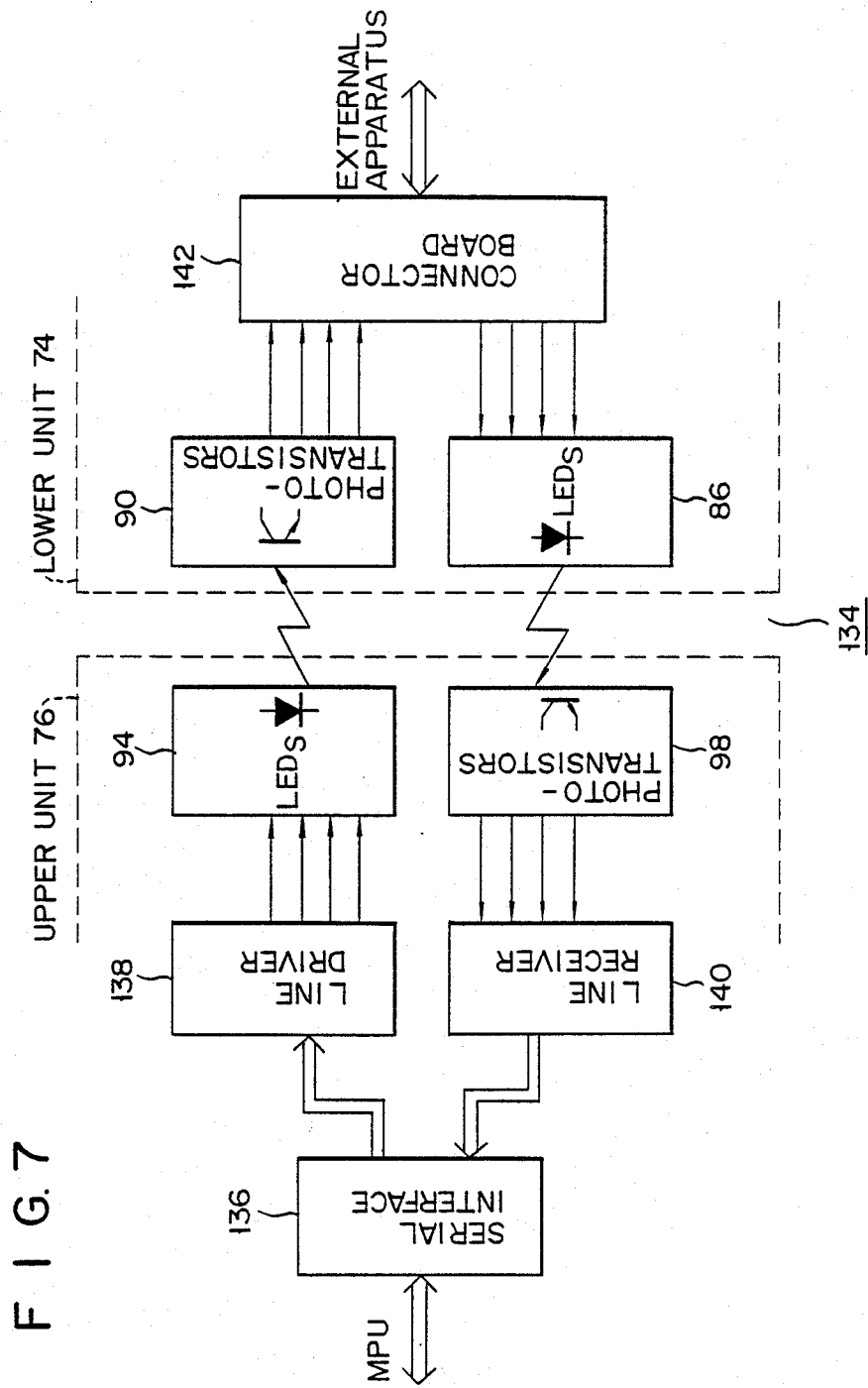
FIG. 7 is a block diagram showing a detailed circuit construction of an interface shown in FIG. 6.

FIG. 7 is a detailed block diagram showing interface circuit 134 shown in FIG. 6. Interface circuit 134 includes serial interface circuit 136 which is provided on the side of upper unit 76. Serial interface circuit 136 serves to receive parallel data from MPU 102, convert the received data into serial data and provide the serial data to line driver 138. Serial interface circuit 136 also serve to convert serial data from data of the external apparatus fed from line receiver 140 into parallel data and provide the parallel data to MPU 102. Light-emitting element group 94 consists of a plurality of light-emitting elements 92, e.g., light-emitting diodes (LEDs), corresponding to respective signal lines from line driver 138, and it converts the electric signal into an optical signal to effect transmission data as optical data to lower unit 74. Light-receiving element group 98 consists of light-receiving elements 96, e.g., phototransistors, for receiving optical signal form lower unit 74 and converting it into electric signal.

In lower unit 74, light-receiving element group 90 consists of light-receiving elements 88, e.g., phototransistors, for receiving optical signal from upper unit 76 and converting it into electric signal. Connector board 142 serves as a relay between apparatus 10 and external apparatus. Light-emitting element group 86 consists of a plurality of light-emitting elements 84, e.g., LEDs, provided for respective signal lines from connector board 142, and it converts electric signal from the external apparatus fed through connector board 142 into an optical signal for transmission of data as optical data to upper unit 76.

More specifically, serial interface circuit 136 converts control signal and status data from MPU 102 and image read-out output data from CCD line sensor 40 into serial data, which are fed through line driver 138 to light-emitting element group 94 for on-off operating the same, whereby electric data is converted into optical data. Light-receiving element group 90 provided in lower unit 74 in correspondence to light-emitting element group 94 provided in upper unit 76, receives signal due to the on-off operation of light-emitting element group 94 in upper unit 76 and effects faithful reproduction of electric signal from optical signal. Thus, control signal and status data from MPU 102 and image read-out output data from CCD line sensor 40 can be transmitted to the external apparatus.

Conversely, the control signal and command data from the external apparatus are relayed through connector board 142 to on-off operate light-emitting element group 86 for conversion from electric data into optical data. Light-receiving element group 98 provided in upper unit 76 in correspondence to light-emitting element group 86 in lower unit 74 receives signal due to on-off operation of light-emitting element group 86 for faithful reproduction of electric data from optical data. The control signal and command data from the external apparatus thus can be transmitted to MPU 102 provided in upper unit 76.

By the above optical data transmission means for transmitting data as optical data, the following effects can be obtained.

(1) Since apparatus 10 consists of separate lower and upper units 74 and 76, the assembling of each unit can be facilitated to improve the efficiency and economy of the assembling operation.

(2) No relay connectors need be provided between the two units, and it is only necessary to connect a power supply cable between lower and upper units 74 and 76. It is thus possible to eliminate the structure of bundling harnesses for control signals and data signals at the hinge between lower and upper units 74 and 76. Further, the wiring can be reduced. It is thus possible to reduce cost of connectors and wiring harnesses.

(3) It is possible to realize high speed transmission of data as optical data.

(4) The transmission of data as optical data is less susceptible to the influence of externally generated electric and magnetic noise due to power supply 70, fluorescent lamp 46, fluorescent lamp inverter, motor 68, etc.

As light-emitting elements 84 and 92 visible range light source LEDs, LED arrays, and laser elements outside the visible range as well as LEDs noted above may be used. As light-receiving elements 88 and 96 phototransistors, photodiodes, photoconductive cells, PIN diodes and other light-receiving sensors capable of use for light sources of visible range and outside the visible range may be used.

Figure 8:
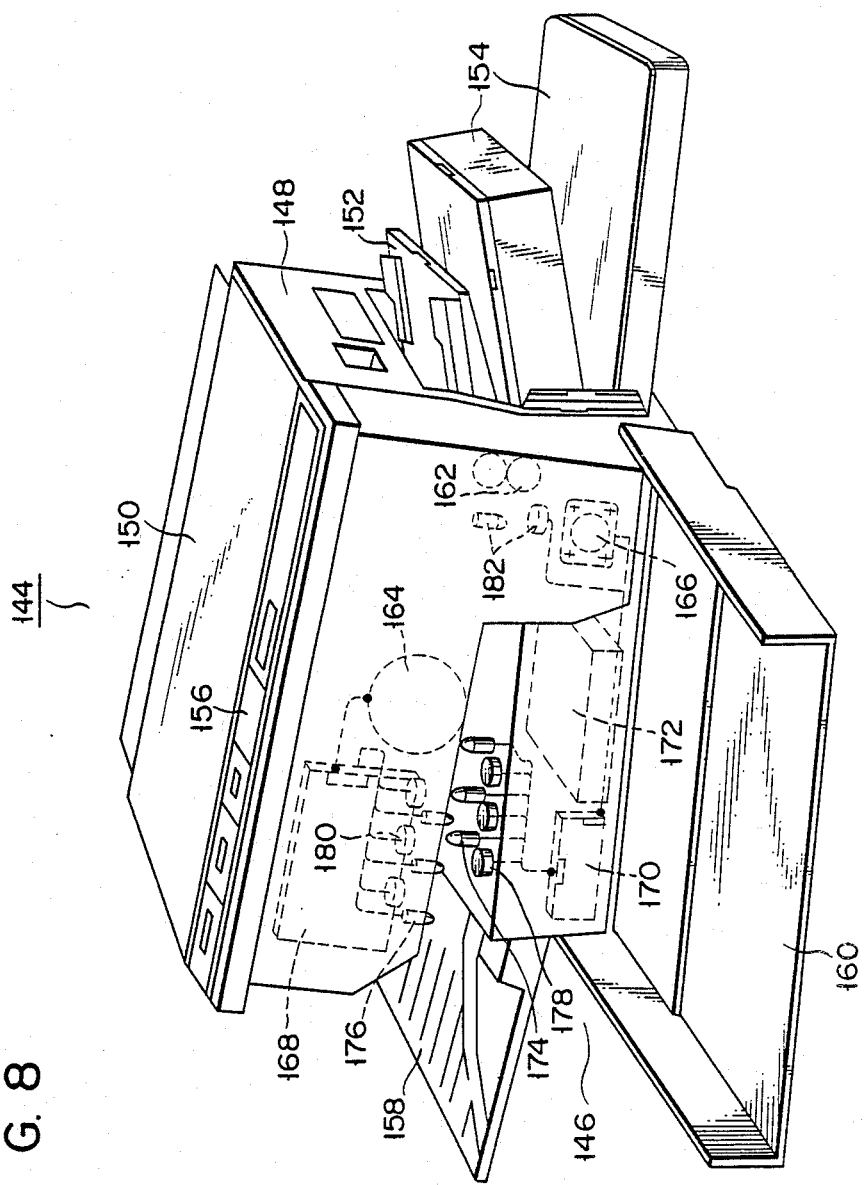
FIG. 8 is a perspective view showing a copying apparatus as an office machine having clamshell structure according to the invention, with an essential portion being shown schematically.

FIG. 8 is a perspective view, with some schematics visible, showing copying apparatus 144 as an office machine having a structure capable of being opened and closed according to the invention. For the detailed construction of the copying apparatus, refer to, for example, U.S. patent specification No. 4,466,729.

Copying apparatus 144 comprises separate lower and upper units 146 and 148, and it also has a mechanism of opening and closing lower and upper units 146 and 148. In the Figure, upper unit 148 is shown in an upwardly opened state. In this copying apparatus 144, document is set under document retainer cover 150 of upper unit 148. Paper sheets for copying the document are either fed manually from manual paper feed guide 152 or fed from paper sheet cassettes 154, in which paper sheets are accommodated. A paper sheet that is fed is transported along a transport path which is defined as being between lower and upper units 146 and 148. Apparatus 144 is controlled according to data fed from operation panel 156 which has push-buttons for various operations, and various displays. Paper sheets, with the document having been copied thereon, are discharged into and accumulated in discharging tray 158.

FIG. 8 shows apparatus 144 with front cover 160 thereof turned toward the front. Paper sheets accommodated in paper sheet cassette 154 are each taken out by pair paper feed rollers 162 to proceed under photosensitive drum 164, round which a series of processes of charging, exposure, development, transfer and separation are performed, and then discharged into and accumulated in discharging tray 158. Feed rollers 162 activated by feed roller drive motor 166 are provided in lower unit 146. Operation panel 156, photosensitive drum 164, as well as copying sheet transport rollers, a fixing unit, fixing rollers, etc. (which are not shown) are controlled by main controller substrate 168 provided in upper unit 148. Sub-controller substrate 170, which is controlled by main controller substrate 168, is provided in lower unit 146. Sub-controller substrate 170 controls power source unit 172, which supplies power to feed roller drive motor 166 and to the drive sections and control sections of apparatus 144.

Light-emitting element groups 174 and 176 and light-receiving element groups 178 and 190 are provided in lower and upper units 146 and 148. Light-emitting element group 174 of lower unit 146 consists of a plurality of light-emitting elements facing respective light-receiving elements of light-receiving element group 180 of upper unit 148, and light-receiving element group 178 of lower unit 146 consists of a plurality of light-receiving elements facing respective light-emitting elements 176 of upper unit 148. When upper unit 148 of apparatus 144 is closed, the light-emitting and light-receiving elements are set in positions within their permissible ranges. Thus control signal lines and data signal lines are replaced with an optical relay between lower and upper units 146 and 148.

More specifically, main controller substrate 168 of upper unit 148 has a main MPU constituting the center of apparatus 144. Sub-controller substrate 170 of lower unit 146 has a sub MPU for controlling feed roller motor 166, power supply unit 172, etc. The transfer of data concerning control signals between main and sub MPUs is effected through the transfer of optical data between the light-emitting and light-receiving elements.

Reference numeral 182 in FIG. 8 designates paper sheet jamming sensor.

Figure 9:
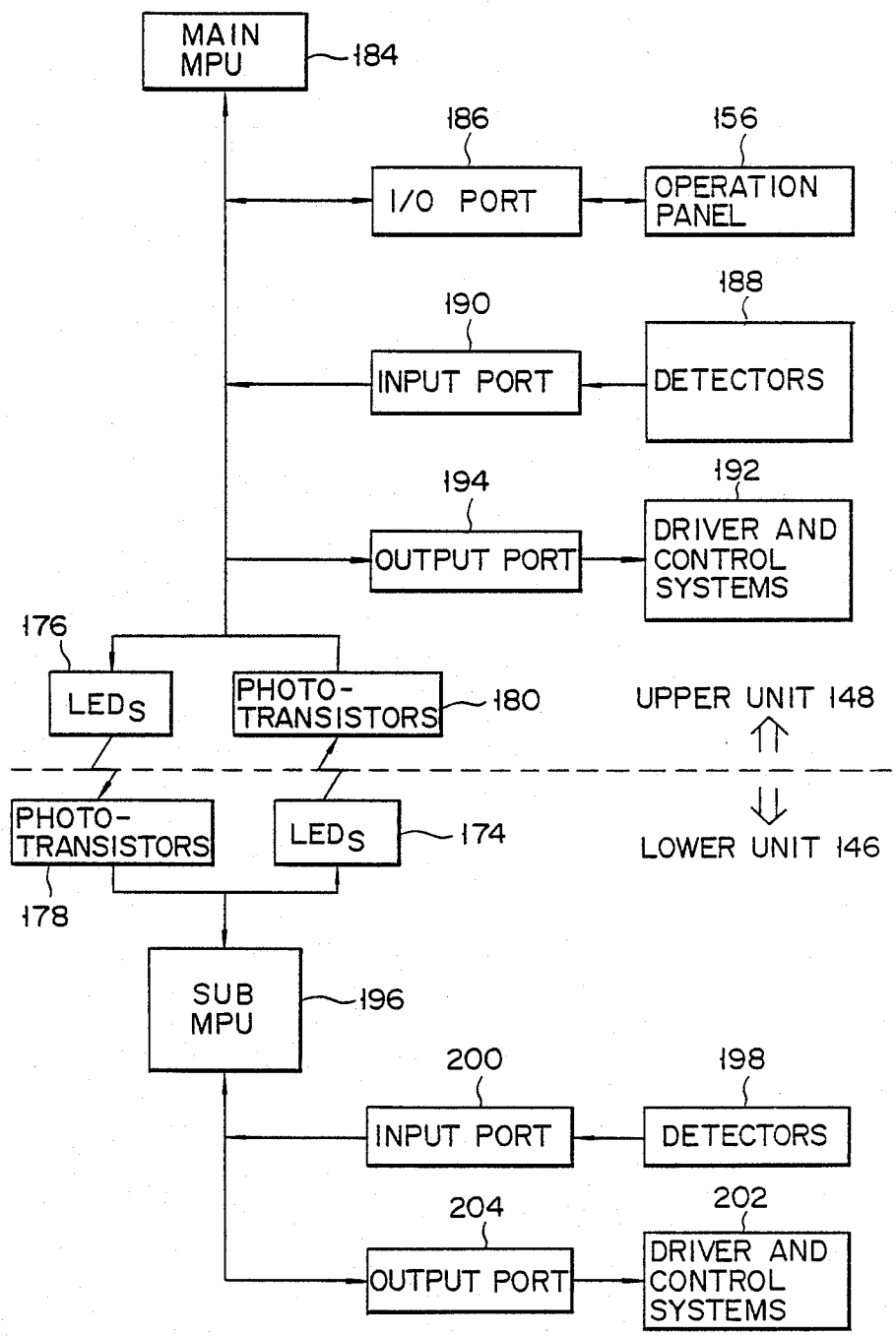
FIG. 9 is a block diagram showing the copying apparatus shown in FIG. 8.

FIG. 9 is a block diagram showing an essential part of a control system in copying apparatus 144. The output of display data from main MPU 184 provided on main control substrate 168 to operation panel 156 and input of data from operated push-buttons to main MPU 184 are effected through I/O port 186. Data from various detectors 188, i.e., toner replenishment check sensor fixing unit thermistor, paper sheet pass sensor, etc. which are not shown in FIG. 8, are fed to main MPU 184 through input port 190. Data from main MPU 184 is fed to various drivers and control systems 192 for photosensitive drum 164, and discharging rollers, fixing rollers, and fluorescent lamp which are not shown in FIG. 8 through output port 194.

The transfer of data between main MPU 184 and sub MPU 196 provided on sub-controller substrate 170 for control of an electric system of lower unit 146 of apparatus 144 is effected through light-emitting element groups 174 and 176 and light-receiving element groups 178 and 180. Light-emitting element group 176 of upper unit 148 consists of a plurality of light-emitting elements, i.e., LEDs corresponding to respective signal lines from main MPU 184. Optical data from these light-emitting elements is received by light-receiving element group 178 of lower unit 146 consisting of phototransistors, for instance to be converted into electric signal fed to sub MPU 196. Light-emitting element group 174 of lower unit 146 consists of a plurality of light-emitting elements, e.g., LEDs, corresponding to respective control signal lines from sub MPU 196. Optical data from these light-emitting elements is received by light-receiving element group 180 of upper unit 148 consisting of phototransistors, for instance to be converted into electric signal fed to main MPU 184.

In lower unit 146, data from various detectors 198, such as jamming sensor 182 and paper sheet check sensors in paper sheet cassettes 154 (which are not shown in FIG. 8,) is read into sub MPU 196 through input port 200. Control data from sub MPU 196 is fed to various drivers and control systems 202 for feed roller drive motor 166, power supply unit 172, etc. through output port 204.

More specifically, main MPU 184 provided in upper unit 148 of apparatus 144 effects control of the electric system of upper unit 148 and also effects control of sub MPU 196 provided in lower unit 146 by means of an optical relay constituted of light-emitting element groups 174 and 176 and light-receiving element groups 178 and 180. Sub MPU 196 provided in lower unit 146 effects control of the electric system of lower unit 146 and data collection and effects data transfer to main MPU 184 provided on upper unit 148 by making use of the optical relay means. In this way, transfer of data signal between lower and upper units 146 and 148 is effected by making use of the light-emitting and light-receiving elements.

It is thus possible to obtain the same effects as in the previous embodiment.

In the above embodiments, the light-emitting and light-receiving elements of lower and upper units are provided in separate arrays, but this is by no means limitative.

What is claimed is:

1. An office machine comprising:
   a first unit, having control means for controlling said office machine;
   first light-emitting means, provided in said first unit, for converting an output signal from said control means into an optical signal;
   a second unit, openable and closeable in relation to said first unit, and having operation means operable in response to said output signal from said control means, when said second unit is closed; and
   first light-receiving means, provided in said second unit, for facing said first light-emitting means of said second unit, receiving the optical signal from said first light-emitting means, converting the optical signal to an electrical signal, and then transmitting the electrical signal to said operating means of said second unit, when said second unit is closed in relation to said first unit.

2. The office machine according to claim 1, further comprising:
   second light-emitting means, provided in said second unit, for converting a signal to be transmitted from said second unit to said control means of said first unit into an optical signal; and
   second light-receiving means, provided in said first unit, for facing said second light-emitting means of said first unit, receiving the optical signal from said second light-emitting means, converting the optical signal to an electrical signal, and then transmitting the electrical signal to said control means of said first unit, when said second unit is closed in relation to said first unit.

3. The office machine according to claim 2, wherein said first unit further includes an optical system for reading an image, under the control of said control unit, said second unit further includes an interface means for receiving a signal from outside of said office machine and transmitting a signal to the outside thereof, the signal receivable by said interface means of said second unit being a command signal which is converted into an optical signal by said second light-emitting means of said second unit, to be transmitted from said second unit to said first unit, converted to an electrical signal when said second light-receiving means of said first unit receives said optical signal, and then transmitted to said control means, and the signal, which is transmitted by said interface means and which includes either an image date signal derived from said optical system or a status signal output from said control means, is converted to an optical signal by said first light-emitting means of said first unit, to be transmitted from said first unit to said second unit, converted to an electrical signal when said first light-receiving means of said second unit receives said optical signal, and then transmitted to said interface means.

4. The office machine accoridng to claim 2, wherein said first and second light-emitting means comprise light-emitting diodes, and said first and second light-receiving means comprise phototransistors.

5. The office machine according to claim 2, wherein said control means in said first unit includes a main microprocessor, said second unit includes driver systems, control systems, and a sub-microprocessor controlled by said main microprocessor for controlling said driver and control systems, said main microprocessor capable of outputting data which are converted into an optical signal by said first light-emitting means of said first unit, to be transmitted from said first unit to said second unit, are converted to an electrical signal when said first light-receiving means of said second unit receives said optical signal, and are then transmitted to said sub-microprocessor, and said sub-microprocessor outputs data which are converted to an optical signal by said second light-emitting means of said second unit, to be transmitted from said second unit to said first unit, are converted to an electrical signal when said second light-receiving means of said first unit receives said optical signal, and are then transmitted to said main microprocessor.

6. The office machine according to claim 5, wherein said first and second light-emitting means comprise light-emitting diodes, and said first and second light-receiving means comprise phototransistors.

7. An image reading apparatus comprising:
   a first unit, having control means for controlling said image reading apparatus;

first light-emitting means, provided in said first unit, for converting an output signal from said control means to an optical signal;

a second unit, openable and closeable in relation with said first unit, and having operation means operable in response to said output signal from said control means when said second unit is closed; and first light-receiving means, provided in said second unit, for facing said first light-emitting means of said second unit, receiving the optical signal from said first light-emitting means, converting the optical signal to an electrical signal, and then transmitting the electrical signal to said operating means of said second unit, when said second unit is closed.

8. The image reading apparatus according to claim 7, further comprising:

second light-emitting means, provided in said second unit, for converting a signal to be transmitted from said second unit to said control means of said first unit into an optical signal; and second light-receiving means, provided in said first unit, for facing said second light-emitting means of said first unit, receiving the optical signal from said second light-emitting means, converting the optical signal to an electrical signal, and then transmitting the electrical signal to said control means of said first unit, when said second unit is closed in relation to said first unit.

9. The image reading apparatus according to claim 8, wherein said first unit further includes an optical system for reading an image, under the control of said control unit, said second unit further includes an interface means for receiving a signal from outside of said image reading apparatus and transmitting a signal to the outside thereof, the signal receivable by said interface means of said second unit being command signal which may be converted into an optical signal by said second light-emitting means of said second unit, to be transmitted from said second unit to said first unit, converted to an electrical signal when said second light-receiving means of said first unit receives said optical signal, and then may be transmitted to said control means, and the signal, which is transmitted by said interface means and which includes either an image data signal derived from said optical system or a status signal output from said control means, and then may be converted to an optical signal by said first light-emitting means of said first unit, to be transmitted from said first unit to said second unit, converted to an electrical signal when said first light-receiving means of said second unit receives said optical signal, and then transmitted to said interface means.

10. The image reading apparatus according to claim 9, wherein said first and second light-emitting means comprise light-emitting diodes, and said first and second light-receiving means comprise phototransistors.

11. A copying apparatus comprising:

a first unit, having control means for controlling said copying apparatus;

first light-emitting means, provided in said first unit, for converting an output signal from said control means into an optical signal;

a second unit openable and closeable in relation with said first unit, and having operation means operable in response to said output signal from said control means, when said second unit is closed; and first light-receiving means, provided in said second unit, for facing said first light-emitting means of said second unit, receiving the optical signal from said first light-emitting means, converting the optical signal to an electrical signal, and then transmitting the electrical signal to said operating means of said second unit, when said second unit is closed.

12. The copying apparatus according to claim 11, further comprising:

second light-emitting means, provided in said second unit, for converting a signal to be transmitted from said second unit to said control means of said first unit into an optical signal; and second light-receiving means, provided in said first unit, for facing said second light-emitting means of said first unit, receiving the optical signal from said second light-emitting means, converting the optical signal to an electrical signal, and then transmitting the electrical signal to said control means of said first unit, when said second unit is closed in relation to the first unit.

13. The copying apparatus according to claim 12, wherein said control means in said first unit includes a main microprocessor, said second unit includes driver systems, control systems, and a sub-microprocessor controlled by said main microprocessor, for controlling said driver and control systems, said main microprocessor capable of outputting data which may be converted into an optical signal by said first light-emitting means of said first unit, to be transmitted from said first unit to said second unit, converted into an electrical signal when said first light-receiving means of said second unit receives said optical signal, and then transmitted to said sub-microprocessor, and said sub-microprocessor capable of outputting data which are converted into an optical signal by said second light-emitting means of said second unit, to be transmitted from said second unit to said first unit, converted to an electrical signal when said second light-receiving means of said first unit receives said optical signal, and then transmitted to said main microprocessor.

14. The copying apparatus according to claim 13, wherein said first and second light-emitting means comprise light-emitting diodes, and said first and second light-receiving means comprise phototransistors.

* * * * *